(12) United States Patent
Joung

(10) Patent No.: US 9,127,852 B2
(45) Date of Patent: Sep. 8, 2015

(54) AIR PURIFIER AND AN OPERATING METHOD FOR THE SAME

(75) Inventor: Jin-Kyu Joung, Seoul (KR)

(73) Assignee: Woongjin Coway Co., Ltd (KR)

( * ) Notice: Subject to any disclaimer, the term of this patent is extended or adjusted under 35 U.S.C. 154(b) by 360 days.

(21) Appl. No.: 13/577,770

(22) PCT Filed: Feb. 25, 2011

(86) PCT No.: PCT/KR2011/001369
§ 371 (c)(1),
(2), (4) Date: Aug. 8, 2012

(87) PCT Pub. No.: WO2011/105864
PCT Pub. Date: Sep. 1, 2011

(65) Prior Publication Data
US 2012/0297975 A1    Nov. 29, 2012

(30) Foreign Application Priority Data

Feb. 25, 2010 (KR) .......................... 10-2010-0017174
Feb. 25, 2011 (KR) .......................... 10-2011-0017266

(51) Int. Cl.
*F24F 6/06* (2006.01)

(52) U.S. Cl.
CPC ............ *F24F 6/06* (2013.01); *F24F 2006/065* (2013.01)

(58) Field of Classification Search
None
See application file for complete search history.

(56) References Cited

U.S. PATENT DOCUMENTS

| 2008/0127820 A1* | 6/2008 | Park et al. ............................ 95/1 |
| 2010/0201007 A1* | 8/2010 | Tsuda et al. .................... 261/83 |
| 2012/0187586 A1 | 7/2012 | Tsuda et al. |

FOREIGN PATENT DOCUMENTS

| JP | 2005090934 | 4/2005 |
| JP | 2008064429 | 3/2008 |
| JP | 2009-024959 | 2/2009 |
| JP | 2009250504 | 10/2009 |
| JP | 2009250596 | 10/2009 |
| KR | 1020090080199 | 7/2009 |

* cited by examiner

*Primary Examiner* — Duane Smith
*Assistant Examiner* — Phillip Shao
(74) *Attorney, Agent, or Firm* — The Farrell Law Firm, P.C.

(57) ABSTRACT

Disclosed is an air purifier able to maintain the normal state of drive of a disk-shaped humidification filter by controlling the state of rotation of the humidification filter. The air purifier can maintain the normal state of drive of the humidification filter by using a stepping motor and the control unit in order to vary the state of rotation of the humidification filter and thereby remove extraneous material when the humidification filter is rotating abnormally due to extraneous material.

3 Claims, 8 Drawing Sheets

AIR PURIFIER AND AN OPERATING METHOD FOR THE SAME

PRIORITY

This application is a National Phase Entry of PCT International Application No. PCT/KR2011/001369 filed Feb. 25, 2011, and claims priority to Korean Patent Application No. 10-2010-0017174 filed with the Korean Intellectual Property Office on Feb. 25, 2010, and to Korean Patent Application No. 10-2011-0017266 filed with the Korean Intellectual Property Office on Feb. 25, 2011, the contents of each of which is incorporated herein by reference.

TECHNICAL FIELD

The present invention relates to an air purifier and an operating method thereof, and more particularly, to an air purifier expelling humidified air through a humidification filter, and an operating method thereof.

BACKGROUND ART

In general, an air purifier is a device that filters contaminant dust or materials harmful to humans from air, through various filters to provide fresh air. A humidification type air purifier, among air purifiers, is a device using a principle that air purified through various filters is changed into humidified air when it passes through a humidification filter.

Here, water used in a humidification type air purifier, i.e., water absorbed into a humidification filter, includes dissolved solids. Thus, mineral components such as magnesium, potassium, or calcium, i.e., dissolved solids, are absorbed into the humidification filter in an ionic state. When purified air passes through the humidification filter by the action of a fan, dissolved solids are formed as white solids in the humidification filter.

In order to prevent a formation of these white solids, a humidifying operation is performed through a plurality of disk-type humidification filters mounted on a rotational shaft such that portions thereof are immersed in a water tank.

However, when foreign objects, or the like, are caught in a space between the disk type humidification filters and the water tank, the humidification filters may not rotate or may rotate abnormally, resulting in a situation in which the humidification filters cannot provide moisture in air expelled from the air purifier or the humidification performance thereof is degraded.

In addition, when the disk type humidification filters are eccentric with respect to the rotational shaft, they may not be able to rotate due to various issues.

Namely, a disk constraint state in which the humidification filters do not rotate normally may occur.

When the humidification filters do not rotate, the air purifier is required to be stopped to perform a maintenance operation to remove foreign objects caught in the space between the humidification filters and the water tank.

Namely, an air purifier in which whether or not humidification filters are rotating normally is detected, and when the humidification filters are not rotating, foreign objects caught in a space between the humidification filters and a water tank may be simply removed or a disk constraint state may be released is required.

DISCLOSURE

Technical Problem

An aspect of the present invention provides an air purifier in which a normal driving state of a disk type humidification filter is maintained by controlling a rotational condition of the humidification filter, and an operating method thereof.

Technical Solution

According to an aspect of the present invention, there is provided an air purifier including: a water tank accommodating water therein and having a rotational shaft on which a humidification filter is mounted; a driving source connected to the rotational shaft for rotation thereof; a sensing unit installed in the water tank to sense a driving state of the humidification filter; and a controller connected to the sensing unit and the driving source to control a driving state of the driving source according to a signal from the sensing unit.

The driving source may be configured as a stepping motor for changing a rotational speed or a rotational direction to change torque generated when the humidification filter rotates.

The sensing unit may include: a magnet mounted on the rotational shaft to rotate together therewith; and a magnetic sensor installed in the water tank such that the magnetic sensor is adjacent to the magnet, and senses a magnetic field generated by the magnet.

When the humidification filter is driven abnormally, the controller may drive the driving source to reversely rotate the humidification filter or drive the driving source to repeatedly rotate the humidification filter reversely and forwardly in order to increase torque generated when the humidification filter rotates.

According to another aspect of the present invention, there is provided a method for operating an air purifier, including: a) an operation of rotatably driving a disk type humidification filter; b) a first determination operation of sensing a rotational speed of the humidification filter through a sensing unit to determine a driving state of the humidification filter; and c) an operation of changing the rotational speed of the humidification filter to drive the humidification filter at the changed rotational speed, when the humidification filter is not driven at a rotational speed controlled by a controller.

In operation c), the rotational speed of the humidification filter may be reduced to drive the humidification filter at the reduced speed in order to increase torque generated when the humidification filter rotates.

The method may further include: d) a second determination operation of sensing a rotational speed of the humidification filter through the sensing unit to determine a driving state of the humidification filter; and e) an operation of changing a rotational direction of the humidification filter and driving the humidification filter in the changed direction, when the humidification filter is not driven at a rotational speed controlled by the controller.

In operation e), the humidification filter may be rotatably driven in a direction the reverse of the direction in which the humidification filter rotates in a normal driving state.

In operation e), the humidification filter may be rotatably driven by repeatedly changing the rotational direction thereof such that the humidification filter rotates in the direction the reverse of the direction in which the humidification filter is driven in the normal driving state and then in the forward direction.

In operations b) and d), it may be determined whether or not the humidification filter is rotating at a rotational speed according to a pulse signal transmitted to a driving source from the controller which controls the driving source that changes torque generated when the humidification filter rotates and rotatably drives the humidification filter in forward and reverse directions.

The method may further include: f) a third determination operation of sensing a rotational speed of the humidification filter through the sensing unit to determine a driving state of the humidification filter, after operation e); and g) an operation of stopping driving of the humidification filter when the humidification filter is not driven at a rotational speed controlled by the controller.

The method may further include: a second determination operation of sensing a rotational speed of the humidification filter through the sensing unit to determine a driving state of the humidification filter after operation c); and an operation of stopping driving of the humidification filter when the humidification filter is not driven at the rotational speed controlled by the controller.

According to another aspect of the present invention, there is provided a method for operating an air purifier, including: a') an operation of rotatably driving a disk type humidification filter; b') a first determination operation of sensing a rotational speed of the humidification filter through a sensing unit to determine a driving state of the humidification filter; and c') an operation of changing a rotational direction of the humidification filter to drive the humidification filter in the changed rotational direction, when the humidification filter is not driven at a rotational speed controlled by a controller.

In operation c'), the humidification filter may be rotatably driven in a direction the reverse of the direction in which the humidification filter is driven in a normal driving state.

In operation c'), the humidification filter may be rotatably driven by repeatedly changing the rotational direction thereof such that the humidification filter rotates in the direction the reverse of the direction in which the humidification filter is driven in the normal driving state and then in the forward direction.

The method may further include: d') a second determination operation of sensing a rotational speed of the humidification filter through the sensing unit to determine a driving state of the humidification filter; and e') an operation of changing the rotational speed of the humidification filter to drive the humidification filter at the changed rotational speed, when the humidification filter is not driven at a rotational speed controlled by the controller.

In operation e'), the rotational speed of the humidification filter may be reduced to drive the humidification filter at the reduced rotational speed to increase torque generated when the humidification filter rotates.

In operations b') and d'), it may be determined whether or not the humidification filter is rotating at a rotational speed according to a pulse signal transmitted to a driving source from the controller which controls the driving source that changes torque generated when the humidification filter rotates and rotatably drives the humidification filter in forward and reverse directions.

The method may further include: f') a third determination operation of sensing a rotational speed of the humidification filter through the sensing unit to determine a driving state of the humidification filter, after operation e'); and g') an operation of stopping driving of the humidification filter when the humidification filter is not driven at a rotational speed controlled by the controller.

The sensing unit may sense a rotational speed of the rotational shaft through a signal sensed by a magnetic sensor unit that senses strength of a magnetic field generated by a magnet rotating together with a rotational shaft in which the humidification filter is mounted.

The method may further include: a second determination operation of sensing a rotational speed of the humidification filter through the sensing unit to determine a driving state of the humidification filter after operation c'); and a operation of stopping driving of the humidification filter when the humidification filter is not driven at the rotational speed controlled by the controller.

Advantageous Effects

According to embodiments of the present invention, when the humidification filter rotates abnormally due to foreign objects, the foreign objects are removed by changing a rotational condition of the humidification filter through a stepping motor and a controller, thus maintaining a normal driving state of the humidification filter.

BEST MODE

Hereinafter, an air purifier according to an embodiment of the present invention will be described with reference to the accompanying drawings.

Figure 1:
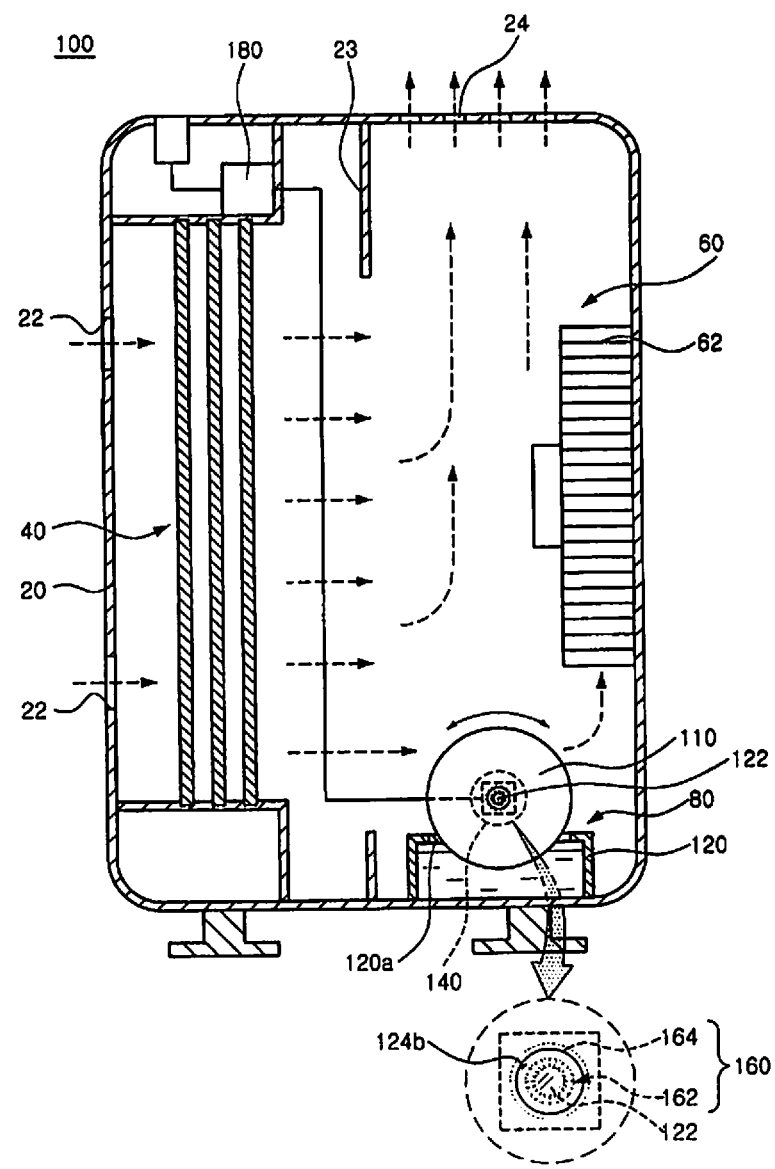
FIG. 1 is a view illustrating a configuration of an air purifier according to an embodiment of the present invention.

FIG. 1 is a view illustrating a configuration of an air purifier according to an embodiment of the present invention.

With reference to FIG. 1, an air purifier 100 according to an embodiment of the present invention includes a water tank 120, a driving source 140, a sensing unit 160, and a controller 180.

Meanwhile, the air purifier 100 according to an embodiment of the present invention may further include a body case 20, a filter unit 40, an intake unit 60, and a humidifying unit 80.

Hereinafter, first, the body case 20, the filter unit 40, the intake unit 60, and the humidifying unit 80 will be briefly described, and then, the water tank 120, the driving source 140, the sensing unit 160, and the controller 180 provided in the air purifier 100 according to an embodiment of the present invention will be described.

The body case 20 having an internal space may include an inlet 22 through which ambient air is introduced, and an outlet 24 through which air introduced through the inlet 22 is expelled. Meanwhile, the body case 20 may further include a partition wall 23 dividing the internal space thereof.

Meanwhile, the filter unit 40 may be disposed in front of the body case 20 in an air flow path, and include a plurality of filters. The filter unit 40 serving to purify introduced air may include a pre-processing filter, a post-processing filter, a high efficiency particulate arresting air (HEPA) filter, an activated carbon filter, and the like.

The intake unit 60 serves to allow ambient air to be introduced into the body case 20 and expelled therefrom, and to this end, the intake unit 60 may include an intake fan 62.

Namely, when the intake fan 62 is driven, ambient air is introduced through the inlet 22 of the body case 20, passes through the filter unit 40, and is then discharged through the outlet 24.

The humidifying unit 80 is disposed in a flow path of introduced air to provide moisture to air being expelled. To this end, the humidifying unit 80 may include a plurality of disk type humidification filters 110, the water tank 120 providing moisture to the humidification filters 110, and the driving source 140 generating driving force to rotatably drive the humidification filters 110.

Hereinafter, the air purifier 100 according to an embodiment of the present invention will be described with reference to FIGS. 2 through 4.

Figure 2:
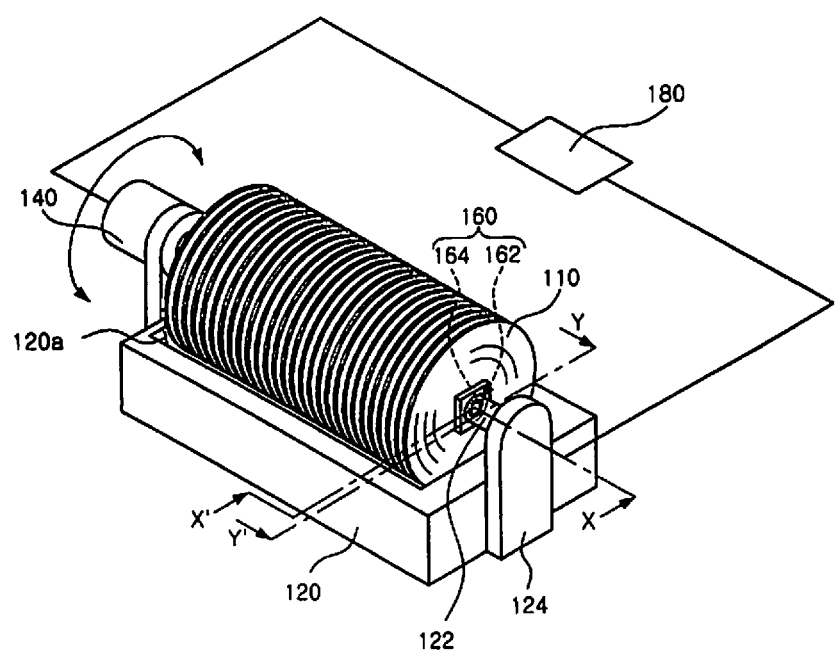
FIG. 2 is a view illustrating a humidifying unit and a controller according to an embodiment of the present invention.

FIG. 2 is a view illustrating a humidifying unit and a controller according to an embodiment of the present invention. FIG. 3 is a cross-sectional view taken along line X-X' illustrated in FIG. 2. FIG. 4 is a cross-sectional view taken along line Y-Y' illustrated in FIG. 2.

Figure 3:
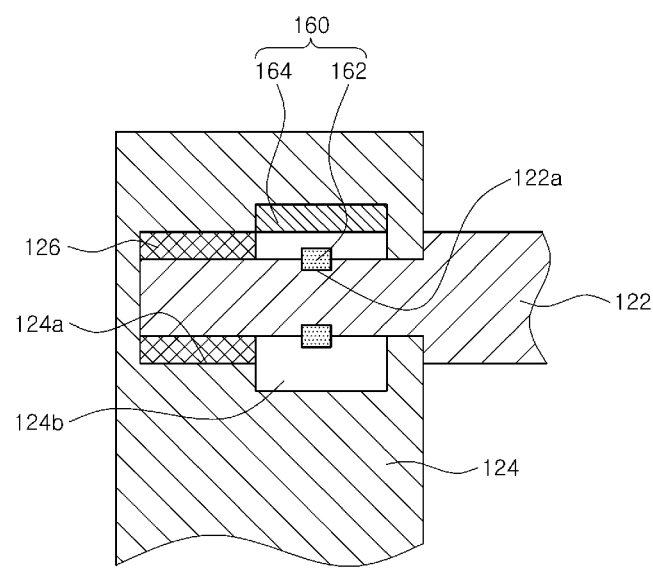
FIG. 3 is a cross-sectional view taken along line X-X' illustrated in FIG. 2.
Figure 4:
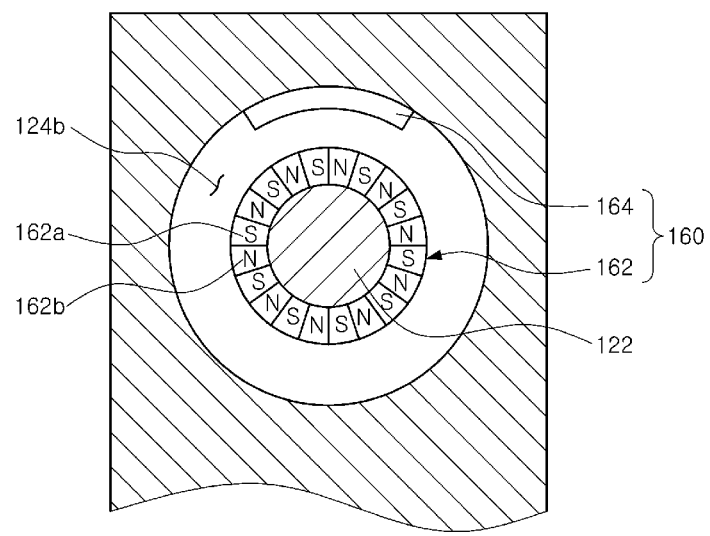
FIG. 4 is a cross-sectional view taken along line Y-Y' illustrated in FIG. 2.

With reference to FIGS. 2 through 4, the humidification filters 110 are formed to have a circular disk-like shape, and lower end portions of the humidification filters 110 may be immersed in the water tank 120 such that moisture can be supplied to the surfaces of the humidification filters 110.

The water tank 120 has water accommodated therein and may have a rotational shaft 122 in which the humidification filters 110 are mounted. Namely, the humidification filters 110 are mounted in the rotational shaft 122 and are rotated together with the rotational shaft 122 when the rotational shaft 122 rotates.

Accordingly, moisture may be constantly supplied to the surfaces of the humidification filters 110 from the water tank 120.

Also, the rotational shaft 122 is rotatably mounted in an installation stand 124 of the water tank 120.

Meanwhile, the humidification filters 110 mounted on the rotational shaft 122 of the water tank 120 are disposed such that the humidification filters 110 are spaced apart by a certain interval from side walls of the water tank 120.

Here, when foreign objects, or the like, are caught in a space 120a between the humidification filters 110 and the water tank 120, the humidification filters 110 cannot be driven normally. Namely, the humidification filters 110 may not be rotated or may be driven to be rotated and repeatedly stopped due to foreign objects.

The driving source 140 is connected to the rotational shaft 122 to rotate the rotational shaft. Namely, the driving source 140 generates driving force for driving rotation of the humidification filters 110, and the rotational shaft 1122 is rotated according to driving of the driving source 140, and accordingly, the humidification filters 110 installed in the rotational shaft 122 may be rotated cooperatively.

Meanwhile, the driving source 140 may be configured as a stepping motor for changing torque generated during driving or a rotational direction.

Since the driving source 140 is configured as a stepping motor, a rotational speed and torque generated when the driving source 140 is driven may be changed. Namely, when the rotational speed increases, torque generated when the humidification filters 110 are driven is reduced, and when the rotational speed is reduced, torque generated when the humidification filters 110 are driven is increased.

Also, since the driving source 140 is configured as a stepping motor, it can drive the rotational shaft 122 in forwards and backwards directions.

The sensing unit 160 is installed in the water tank 120 in order to sense a driving state of the humidification filters 110.

Meanwhile, the sensing unit 160 may include, for example, a magnet 162 and a magnetic sensor 164.

The magnet 162 may be mounted on the rotational shaft 122 such that it may be rotated together therewith. Namely, the magnet 162 may be inserted into a fastening recess 122a formed in the rotational shaft 122 so as to be rotated together with the rotational shaft 122 when the rotational shaft 122 rotates.

The magnet 162 is an annular permanent magnet. For example, the magnet 162 may be installed as a single magnet in the rotational shaft 122. In another example, as shown in FIG. 2, the magnet 162 may be installed on the rotational shaft 122 such that S poles 162a and N poles 162b thereof are arranged to be contiguous at equal intervals.

The magnetic sensor 164 is installed to be adjacent to the magnet 162 in the water tank 120 in order to sense a magnetic field generated by the magnet 162.

Namely, the magnetic sensor 164 is installed on the installation stand 124 of the water tank 120. In detail, an installation recess 124a is formed in the installation stand 124 to allow the rotational shaft 122 to be rotatably installed, and a bearing 126 may be insertedly mounted in the installation recess 124a to allow the rotational shaft 122 to be smoothly rotated.

Meanwhile, the installation recess 124a may include a mounting recess 124b in which the magnetic sensor 164 is mounted to be opposed to the magnet 162 mounted on the rotational shaft 122.

In other words, the magnetic sensor 164 is installed in the mounting recess 124b and senses a change in a magnetic field generated by the magnet 162 rotated together with the rotational shaft 122, namely, a speed of a change in a magnetic field with respect to S poles and N poles sensed according to a change in a rotational speed of the S poles 162a and the N poles 162b.

Meanwhile, the magnetic sensor 164 may be connected to the controller 180, and a signal with respect to a change in a magnetic field sensed by the magnetic sensor 164 may be output to the controller 180.

The controller 180, connected to the sensing unit 160 and the driving source 140, controls a driving condition of the driving source 140 according to a signal from the sensing unit 160.

Namely, after the controller 180 determines whether or not the humidification filter 110 is being normally driven according to a signal from the sensing unit 160, the controller 180 may control the driving source 140 to change a rotational speed and rotational direction thereof to drive the humidification filter 110.

In detail, while the humidification filter 110 is being rotatably driven, namely, while the humidification filter 110 is being rotatably driven in a normal driven state, when foreign objects, or the like, are caught in the space 120a between the humidification filter 110 and the water tank 120, the humidification filter 110 cannot rotate normally.

Namely, the humidification filter 110 will not rotate, may rotate and be stopped repeatedly, or may rotate at a reduced rotational speed. In such a case, the controller determines that the humidification filter 110 is rotating abnormally, based on a signal output from the sensing unit 160.

Meanwhile, the normal driving state of the humidification filter 110 refers to a state in which the humidification filter 110 rotates when the humidifying unit is driven to perform a humidification function, and in this case, the humidification filter 110 is driven to rotate at a speed of 15 rpm to generate torque of 1 kgf·cm.

Thereafter, the controller 180 may reduce the rotational speed of the driving source 140, i.e., stepping motor, to increase torque generated when the humidification filter 110 rotates.

In other words, the driving source 140 drives the humidification filter 110 at a speed of 4 rpm to generate torque of 2 kgf·cm. Here, the driving source 140 is driven according to a pulse signal from the controller 180 to drive the humidification filter 110.

The driving source 140 is driven to drive the humidification filter 110 with torque increased by the humidification filter 110 during a certain period of time (e.g., 60 seconds), and at this time, the controller 180 determines a driving condition of the humidification filter 110 through a signal with respect to a rotational speed sensed by the sensing unit 160.

Namely, the humidification filter 110 is required to be driven at a speed of 4 rpm to generate torque of 2 kgf·cm by a pulse signal transmitted from the driving source 140.

Here, however, if a signal transmitted to the controller 180 from the sensing unit 160 is a signal indicating that the humidification filter 110 is not rotating, is rotating and is stopping repeatedly, or is rotating at a speed lower than 4 rpm, the controller 180 determines that the humidification filter 110 is rotating abnormally. Namely, the controller 180 determines that the humidification filter 110 is in a constraint state.

Thereafter, the controller 180 controls the driving source 140 to rotate the humidifying unit 110 in a reverse direction during a certain period of time (e.g., 60 seconds).

Meanwhile, when it is determined the humidification filter 110 is rotating normally according to the signal transmitted to the controller 180, namely, when it is determined that the humidification filter 110 is driven at a speed of 4 rpm to generate torque of 2 kgf·cm according to the pulse signal from the controller 180, the controller 180 controls the driving source 140 to drive the humidification filter 110 in the normal driving state.

When the humidifying unit 110 is controlled to be rotated in a reverse direction by the controller 180, the controller 180 senses whether or not the humidification filter 110 is rotated normally in the reverse direction through the sensing unit 160 after the lapse of a certain period of time.

If foreign objects caught in the space 120a between the humidification filter 110 and the water tank 120 are removed according to the reverse rotation of the humidifying unit 110 so the humidification filter 110 is driven normally in the reverse direction according to a signal from the controller 180, the controller 180 rotates the humidification filter 110 to be rotated in the normal driving state (e.g., the humidification filter 110 rotates at a speed of 15 rpm).

Meanwhile, when foreign objects caught in the space 120a between the humidification filter 110 and the water tank 120 are not removed according to the reverse rotation of the humidification filter 110, the humidification filter 110 cannot rotate normally in the reverse direction. Here, the controller 180 stops the driving of the humidification filter 110.

Thereafter, the controller 180 may display the abnormal rotation state of the humidification filter 110 on a display unit (not shown).

As described above, when the humidification filter 110 rotates abnormally through the driving source 140 configured as a stepping motor and the controller 180 due to foreign objects, the foreign objects are removed by changing the rotational condition of the humidification filter 110, thereby maintaining the normal driving state of the humidification filter 110.

Namely, since the controller 180 controls the driving source 140 according to a signal with respect to the rotational condition of the humidification filter 110 sensed by the sensing unit 160, when the humidification filter 110 is driven abnormally due to foreign objects caught in the space 120a between the humidification filter 110 and the water tank 120, the controller 180 may remove the foreign objects by changing the rotational condition of the humidification filter 110, whereby the humidification filter 110 can be maintained in the normal driving state.

Accordingly, eventually, humidification performance of the air purifier 100 can be enhanced.

A method for operating an air purifier 100 according to an embodiment of the present invention will be described with reference to the accompanying drawings.

Here, the same components as those described above will be described by using the same reference numerals.

Figure 5:
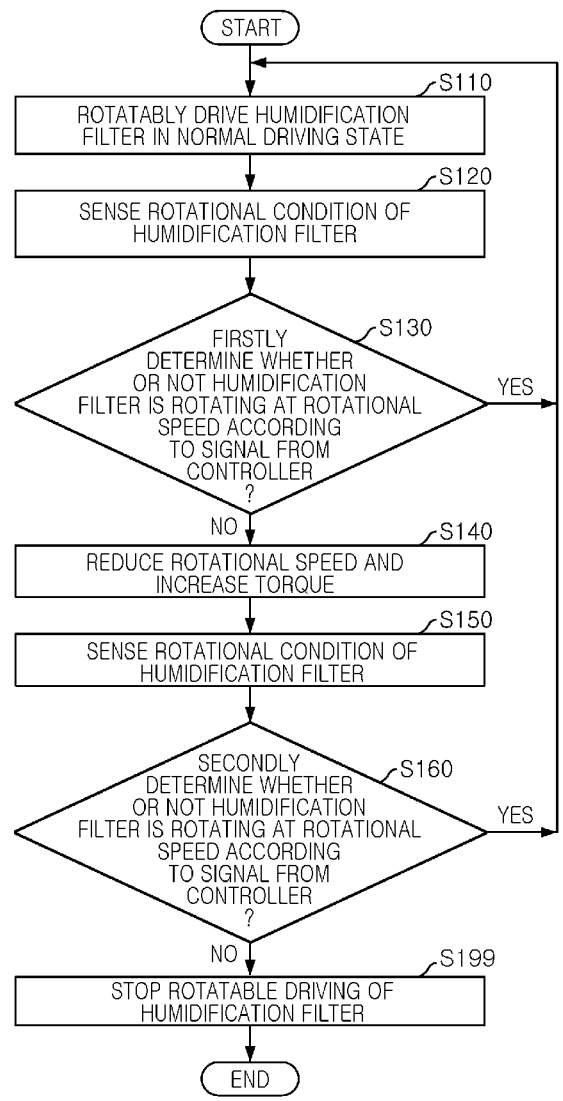
FIGS. 5 and 6 are flow charts illustrating examples of a method for operating an air purifier according to an embodiment of the present invention.
Figure 6:
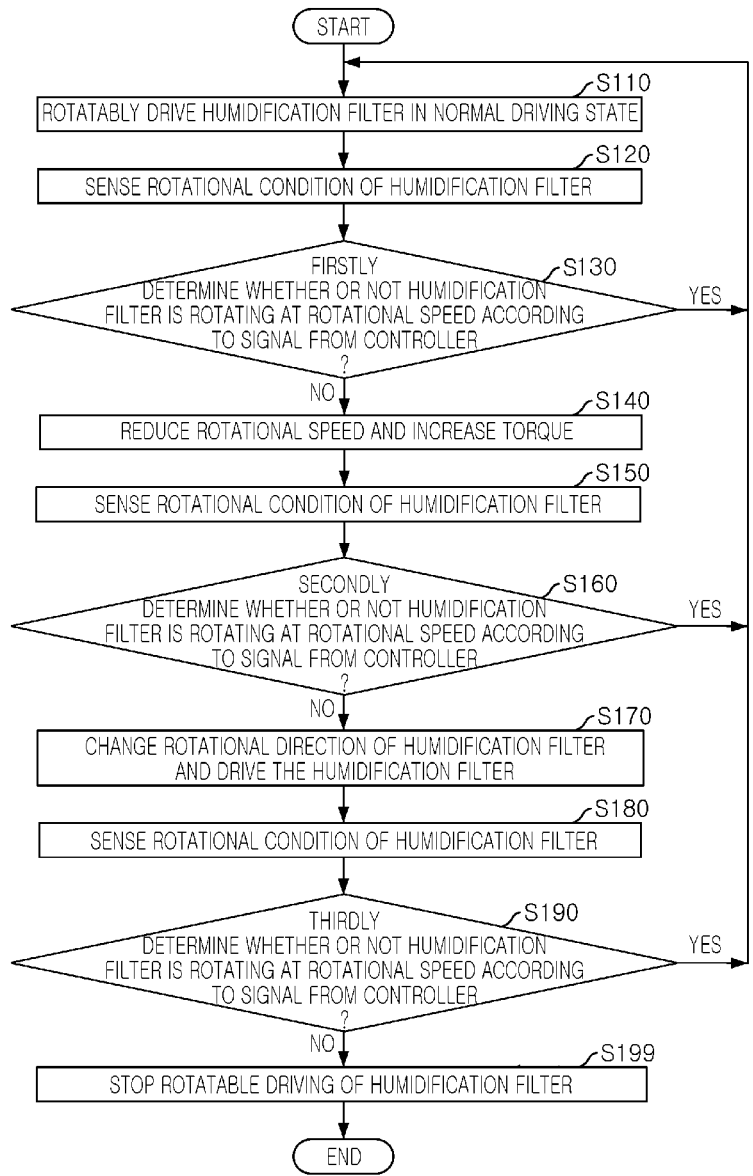

FIGS. 5 and 6 are flow charts illustrating examples of a method for operating an air purifier according to an embodiment of the present invention.

With reference to FIGS. 5 and 6, first, the humidification filter 110 is rotatably driven in a normal driving state (e.g., at a speed of 15 rpm to generate torque of 1 kgf·cm) (S110). Here, the sensing unit 160 senses a rotational condition of the humidification filter 110, namely, a rotational condition (e.g., a rotational speed) of the rotational shaft 122 rotating together with the humidification filter 110 (S120). Thereafter, the sensing unit 160 outputs a signal with respect to the rotational condition of the humidification filter 110 to the controller 180.

The controller 180 determines whether or not the humidification filter 110 is rotating at a rotational speed according to a signal transmitted from the controller 180, through a signal from the sensing unit 160 (S130).

When it is determined that the humidification filter 110 is rotating in the normal driving state, the controller 180 controls the driving source 140 such that the humidification filter 110 is continuously rotating in the normal driving state (e.g., at the speed of 15 rpm to generate torque of 1 kgf·cm) (S110).

However, when it is determined that the humidification filter 110 is rotating abnormally, the controller 180 controls the driving source 140, i.e., the stepping motor, during a certain period of time (e.g., 60 seconds) to reduce the speed of the humidification filter 110 and increase torque generated when the humidification filter 110 rotates (S140).

Namely, the controller 180 controls the driving source 140 to rotate the humidification filter 110, for example, at a speed of 4 rpm to generate torque of 2 kgf·cm for 60 seconds so that foreign objects caught in the space 120a between the humidification filter 110 and the water tank 120 can be removed.

As described above, when the humidification filter 110 is rotatably driven, the sensing unit 160 senses a rotational condition of the humidification filter 110, namely, a rotational condition (e.g., a rotational speed of 0 of the rotational shaft 122 rotating together with the humidification filter 110 (S150)). Thereafter, the sensing unit 160 outputs a signal with respect to the rotational condition of the humidification filter 110 to the controller 180.

Thereafter, the controller determines again whether or not the humidification filter 110 is rotating at the rotational speed (i.e., 4 rpm) according to the signal transmitted from the controller 180, based on a signal from the sensing unit 160 (S160).

When foreign objects are removed by the humidification filter 110 rotating to generate increased torque, the humidification filter 110 can be driven at the rotational speed, i.e., at the speed of 4 rpm, according to the signal from the controller 180. In this case, the controller 180 drives the humidification filter 110 to be driven in the normal driving state (e.g., at the speed of 15 rpm to generate torque of 1 kgf·cm) (S110).

However, when foreign objects are not removed, the humidification filter 110 cannot rotate at the rotational speed (e.g., at the speed of 4 rpm) according to the signal from the controller 180. Then, the controller 180 determines that the humidification filter 110 is driven abnormally, based on the signal from the sensing unit 160.

Here, when it is determined that the humidification filter 110 is driven abnormally, as shown in FIG. 5, the controller 180 controls the driving source 140 to stop rotational driving of the humidification filter 110 after operation 5160 (operation S199), and thereafter, the controller 180 displays the abnormal rotation state of the humidification filter 110 on a display unit (not shown).

Or, as shown in FIG. 6, the controller 180 controls the driving source 140 to rotate the humidification filter 110 for a certain period of time (e.g., 60 seconds) such that foreign objects caught in the space 120a between the humidification filter 110 and the water tank 120, which have not been removed by the humidification filter 110 rotating with increased torque, can be removed according to the rotation of the humidification filter 110 (S170).

Here, in operation 5170, the humidification filter 110 may rotate in a direction the reverse of the direction in which the humidification filter 110 is driven in the normal driving state. Alternatively, in operation 5170, the humidification filter 110 may be driven in the direction the reverse of the direction in which the humidification filter 110 rotates in the normal driving state, and rotates reversely in the reverse direction so as to rotate in the same forward direction as the rotational direction of the normal driving state. Here, as for the rotational direction of the humidification filter 110, the humidification filter 110 may rotate alternately repeatedly in the reverse direction and the forward direction for a certain period of time.

After the humidification filter 110 rotates for a certain period of time through the process as described above in operation 5170, the controller 180 senses a rotational condition of the humidification filter 110 through the sensing unit 160 in order to determine whether or not the humidification filter 110 has rotated normally (S180).

Thereafter, through a signal from the sensing unit 160, the controller 180 determines whether or not the humidification filter 110 is driven normally, namely, whether or not the humidification filter 110 is rotating at the rotational speed (e.g., at 4 rpm in the reverse direction) according to the signal from the controller 180 (S190).

When it is determined that the humidification filter 110 is driven normally, the controller 180 controls the driving source 140 to drive the humidification filter 110 in the normal driving state (S110).

However, when it is determined that the humidification filter 110 is driven abnormally, the controller 180 controls the driving source 140 to stop the rotational driving of the humidification filter 110 (S199), and displays the abnormal rotation state of the humidification filter 110 on the display unit (not shown).

As described above, when the humidification filter 110 rotates abnormally due to foreign objects, the foreign objects are removed by changing the rotational condition of the humidification filter 110 through the driving source 140 configured as a stepping motor and the controller 180, thereby maintaining the humidification filter 110 in the normal driving state.

Namely, when the humidification filter 110 is driven abnormally due to foreign objects caught in the space 120a between the humidification filter 110 and the water tank 120, the controller 180 controls the driving source 140 according to a signal with respect to the rotational condition of the humidification filter 110 sensed by the sensing unit 160 to change the rotational condition of the humidification filter 110 to remove foreign objects, thus maintaining the normal driving state of the humidification filter 110.

Figure 7:
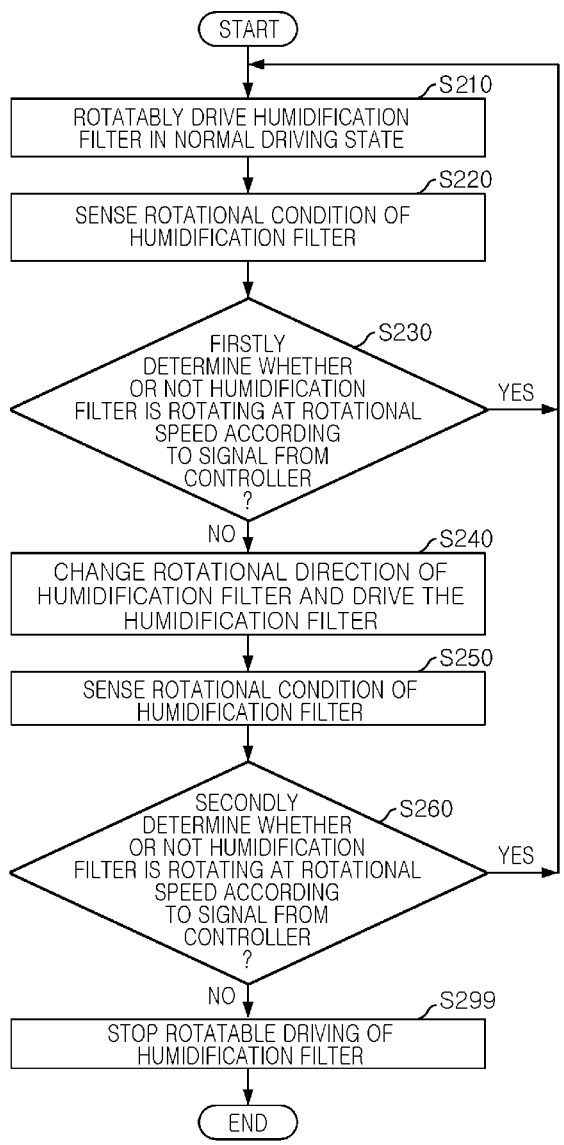
FIGS. 7 and 8 are flow charts illustrating further examples of a method for operating an air purifier according to an embodiment of the present invention.
Figure 8:
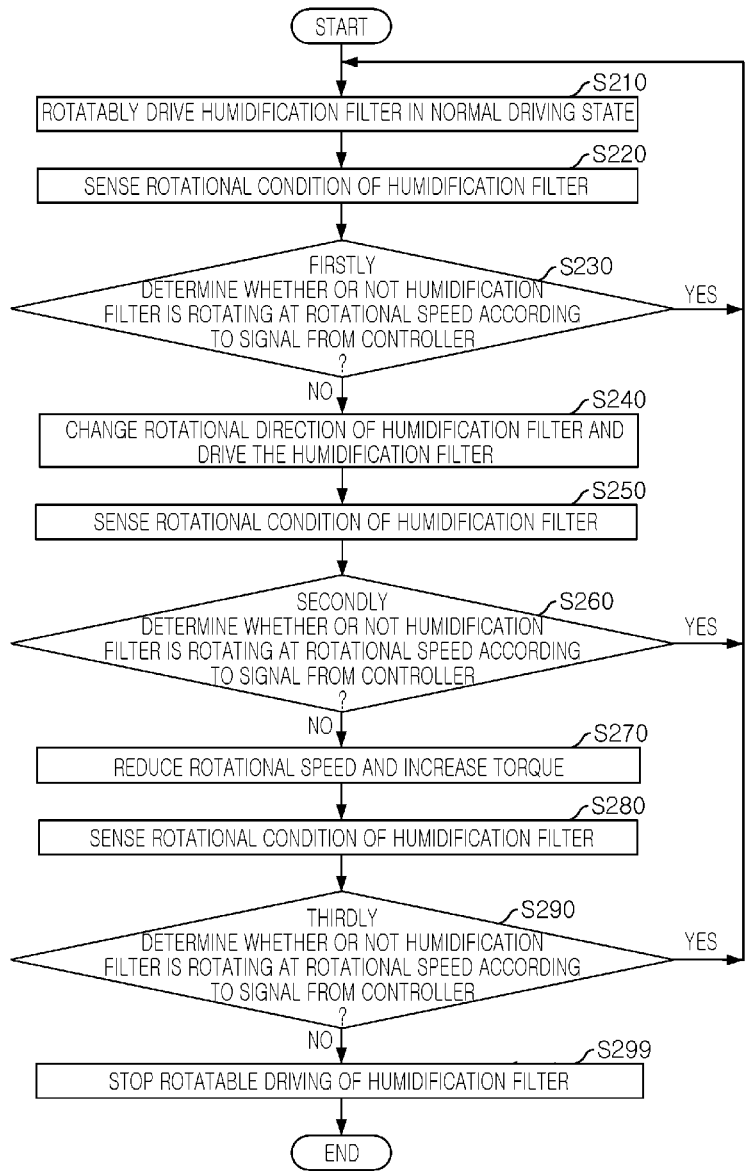

FIGS. 7 and 8 are flow charts illustrating other examples of a method for operating an air purifier according to an embodiment of the present invention.

With reference to FIGS. 7 and 8, first, the humidification filter 110 is rotatably driven in a normal driving state (e.g., at a speed of 15 rpm to generate torque of 1 kgf·cm) (S210). Here, the sensing unit 160 senses a rotational condition of the humidification filter 110, namely, a rotational condition (e.g., a rotational speed) of the rotational shaft 122 rotating together with the humidification filter 110 (S220). Thereafter, the sensing unit 160 outputs a signal with respect to the rotational condition of the humidification filter 110 to the controller 180. The controller 180 determines whether or not the humidification filter 110 is rotating at a rotational speed according to a signal transmitted from the controller 180, through a signal from the sensing unit 160 (S230).

When it is determined that the humidification filter 110 is rotating in the normal driving state, the controller 180 controls the driving source 140 such that the humidification filter 110 continuously rotates in the normal driving state (e.g., at the speed of 15 rpm to generate torque of 1 kgf·cm) (S210).

However, when foreign objects are not removed, the humidification filter 110 cannot rotate at the rotational speed (e.g., at the speed of 15 rpm) according to the signal from the controller 180. Then, the controller 180 determines that the humidification filter 110 is being driven abnormally, based on the signal from the sensing unit 160.

Thereafter, the controller 180 controls the driving source 140 to change the rotational direction of the humidification filter 110 and rotate the humidification filter 110 for a certain period of time (e.g., 60 seconds) such that foreign objects caught in the space 120a between the humidification filter 110 and the water tank 120, which have not been removed by the humidification filter 110 rotating with increased torque, can be removed according to the rotation of the humidification filter 110 (S240).

Here, in operation 5240, the humidification filter 110 may rotate in a direction the reverse of the direction in which the humidification filter 110 is driven in the normal driving state, such that foreign objects caught in the space 120a between the humidification filter 110 and the water tank 120 can be removed according to the rotation of the humidification filter 110.

Or, in operation 5240, the humidification filter 110 have been in the direction the reverse of the direction in which the humidification filter 110 rotates in the normal driving state, and the rotational direction of the humidification filter 110 is changed to the forward direction such that foreign objects caught in the space 120a between the humidification filter 110 and the water tank 120 can be removed according to the rotation of the humidification filter 110. Here, the humidification filter 110 may rotate alternately repeatedly in the reverse direction and the forward direction for a certain period of time.

After the humidification filter 110 rotates for a certain period of time through the process as described above in operation 5240, the controller 180 senses a rotational condition of the humidification filter 110 through the sensing unit 160 in order to determine whether or not the humidification filter 110 has rotated normally (S250).

Thereafter, through a signal from the sensing unit 160, the controller 180 determines whether or not the humidification filter 110 is driven normally, namely, whether or not the humidification filter 110 is rotating at the rotational speed (e.g., at 15 rpm in the reverse direction) according to the signal from the controller 180 (S260).

When foreign objects are removed by the humidification filter 110, the humidification filter 110 is driven at the rotational speed, i.e., at the speed of 15 rpm, according to the signal from the controller 180. In this case, the controller 180 drives the humidification filter 110 to be driven in the normal driving state (e.g., at the speed of 15 rpm to generate torque of 1 kgf·cm) (S210).

Here, when it is determined that the humidification filter 110 is driven abnormally, as shown in FIG. 7, the controller 180 controls the driving source 140 to stop rotational driving of the humidification filter 110 after operation 5260 (S299), and thereafter, the controller 180 may display the abnormal rotation state of the humidification filter 110 on a display unit (not shown).

Or, when it is determined that the humidification filter 110 is rotating abnormally, as shown in FIG. 8, after operation 5260, the controller 180 controls the driving source 140, i.e., the stepping motor, during a certain period of time (e.g., 60 seconds) to reduce the speed of the humidification filter 110 and increase torque generated when the humidification filter 110 rotates (S270).

Namely, the controller 180 controls the driving source 140 to rotate the humidification filter 110, for example, at a speed of 4 rpm to generate torque of 2 kgf·cm for 60 seconds so that foreign objects caught in the space 120a between the humidification filter 110 and the water tank 120 can be removed.

As described above, when the humidification filter 110 is rotatably driven, the sensing unit 160 senses a rotational condition of the humidification filter 110, namely, a rotational condition (e.g., a rotational speed of 0 of the rotational shaft 122 rotating together with the humidification filter 110 (S280). Thereafter, the sensing unit 160 outputs a signal with respect to the rotational condition of the humidification filter 110 to the controller 180.

Thereafter, the controller determines again whether or not the humidification filter 110 is rotating at the rotational speed (i.e., 4 rpm) according to the signal transmitted from the controller 180, based on a signal from the sensing unit 160 (S290).

When it is determined that the humidification filter 110 is being driven normally, the controller 180 controls the driving source 140 to drive the humidification filter 110 in the normal driving state (S210).

However, when it is determined that the humidification filter 110 is being driven abnormally, the controller 180 controls the driving source 140 to stop the rotational driving of the humidification filter 110 (S299), and displays the abnormal rotation state of the humidification filter 110 on the display unit (not shown).

As described above, when the humidification filter 110 rotates abnormally due to foreign objects, foreign objects are removed by changing the rotational condition of the humidification filter 110 through the driving source 140 configured as a stepping motor and the controller 180, thereby maintaining the humidification filter 110 in the normal driving state.

Namely, when the humidification filter 110 is driven abnormally due to foreign objects caught in the space 120a between the humidification filter 110 and the water tank 120, the controller 180 controls the driving source 140 according to a signal with respect to the rotational condition of the humidification filter 110 sensed by the sensing unit 160 to change the rotational condition of the humidification filter 110 to remove foreign objects, thus maintaining the normal driving state of the humidification filter 110.

Accordingly, eventually, humidification performance of the air purifier 100 can be enhanced.

While the present invention has been shown and described in connection with the embodiments, it will be apparent to those skilled in the art that modifications and variations can be made without departing from the spirit and scope of the invention as defined by the appended claims.

The invention claimed is:

1. An air purifier comprising:
a water tank accommodating water therein and having a rotational shaft on which a humidification filter is mounted;
a driving source connected to the rotational shaft for rotation thereof;
a sensing unit installed in the water tank to sense a rotational speed of the humidification filter; and
a controller connected to the sensing unit and the driving source to control a driving state of the driving source according to a signal from the sensing unit,
wherein the controller operates the driving source to change the rotational speed or to change a rotational direction of the humidification filter, when the humidification filter is not driven at a rotational speed instructed by the controller.

2. The air purifier of claim 1, wherein the sensing unit comprises a magnet mounted on the rotational shaft to rotate together therewith; and a magnetic sensor installed in the water tank such that the magnetic sensor is adjacent to the magnet, and senses a magnetic field generated by the magnet.

3. The air purifier of claim 1, wherein when the humidification filter is driven abnormally, the controller drives the driving source to reversely rotate the humidification filter or drives the driving source to repeatedly rotate the humidification filter reversely and forwardly in order to increase torque generated when the humidification filter rotates.

* * * * *